United States Patent
Lin (10) Patent No.: US 6,706,179 B2
(45) Date of Patent: Mar. 16, 2004

(54) WATER MAGNETIZER

(75) Inventor: Shiao-Chih Lin, Panchiao (TW)

(73) Assignee: Aquatech Lifesciences Inc., Taipei (TW)

( * ) Notice: Subject to any disclaimer, the term of this patent is extended or adjusted under 35 U.S.C. 154(b) by 0 days.

(21) Appl. No.: 10/124,231

(22) Filed: Apr. 18, 2002

(65) Prior Publication Data

US 2003/0196945 A1 Oct. 23, 2003

(51) Int. Cl.$^7$ .............................. B01D 35/06; C02F 1/48
(52) U.S. Cl. .................. 210/222; 99/331; 204/660; 204/661; 210/222; 210/695; 219/433; 426/237
(58) Field of Search ................ 99/302 R, 331; 204/661, 666; 210/222, 223, 695; 219/433; 426/237

(56) References Cited

U.S. PATENT DOCUMENTS 3,757,670 A * 9/1973 Laama et al. ............. 99/302 R
5,196,677 A * 3/1993 Stasyshyn .................. 219/433
6,079,319 A * 6/2000 Doria ........................ 99/331
6,440,302 B1 * 8/2002 Leipziger .................... 210/223

* cited by examiner

Primary Examiner—David A. Reifsnyder
(74) Attorney, Agent, or Firm—Rosenberg, Klein & Lee (57) ABSTRACT

The present invention relates to a water magnetizer including a permeance member and a cooking recipient. The permeance member consists of two parallel disks spaced apart each other by a plurality of partitions located along the periphery of the disks, such that there is clearance between the two parallel disks. The permeance member is placed into the cooking recipient that is charged with water. Then, the cooling recipient is placed onto an electromagnetic heater. When the electromagnetic heater powers on, inner coils of the electromagnetic heater regularly vibrate at high frequency to change the direction of electric current and then induce a swirled magnetic field in the clearance. The water would be boiled by a lot of heat generated from electron movement in the induced magnetic field.

6 Claims, 8 Drawing Sheets

WATER MAGNETIZER

BACKGROUND OF THE INVENTION

1. Field of the Invention

The invention relates to a water magnetizer. More specifically, the invention relates to a water magnetizer which magnetizes a fluid inside a cooking recipient by forming a induced magnetic field inside the cooking recipient.

2. Description of the Prior Art

Water is very important for human daily life. The quality of drinking water greatly influences human's health because human body contains 60–70 wt. % of the water with respect to the body weight. Hydrolysis and hydration of protein, fat, and hydrocarbons in the human body require water. Besides, water plays as a carrier for transporting the metabolites and as a biochemical reactant inside the human body. Further, the taste of the drinking water is an important factor for successful commercialization.

The quality of the drinking water closely related to the water source. A polluted water source can not produce good drinking water. Some water sources contain hard water, which can be softened after a conventional purification process. However, some limescales undesirably form after the water is boiled and the boiled water has poor taste.

SUMMARY OF THE INVENTION

It is therefore a principal object of the invention to provide a water magnetizer which can dissolve more oxygen, prevent limescales from being generated, and provide more advantages such as good taste, activation of human cells, and increased metabolism.

In one aspect of the present invention, a water magnetizer including a permeance member and a cooking recipient is provided. The permeance member consists of two parallel disks spaced apart each other by a plurality of partitions located along the periphery of the disks, such that there is clearance between the two parallel disks. The permeance member is placed into the cooking recipient that is charged with water. Then, the cooking recipient is placed onto an electromagnetic heater.

In another aspect of the present invention, a water magnetizer including a permeance member and a cooking recipient is provided. The permeance member consists of a disk and a plurality of partitions arranged along the 4 periphery of the disk. The permeance member is placed into the cooking recipient that is charged with water, such that there is clearance between the disk and a bottom of the cooking recipient. Then, the cooking recipient is placed onto an electromagnetic heater.

To provide a further understanding of the invention, the following detailed description illustrates embodiments and examples of the invention, this detailed description being provided only for illustration of the invention.

DETAILED DESCRIPTION OF THE EMBODIMENTS

Wherever possible in the following description, like reference numerals will refer to like elements and parts unless otherwise illustrated.

Figure 1:
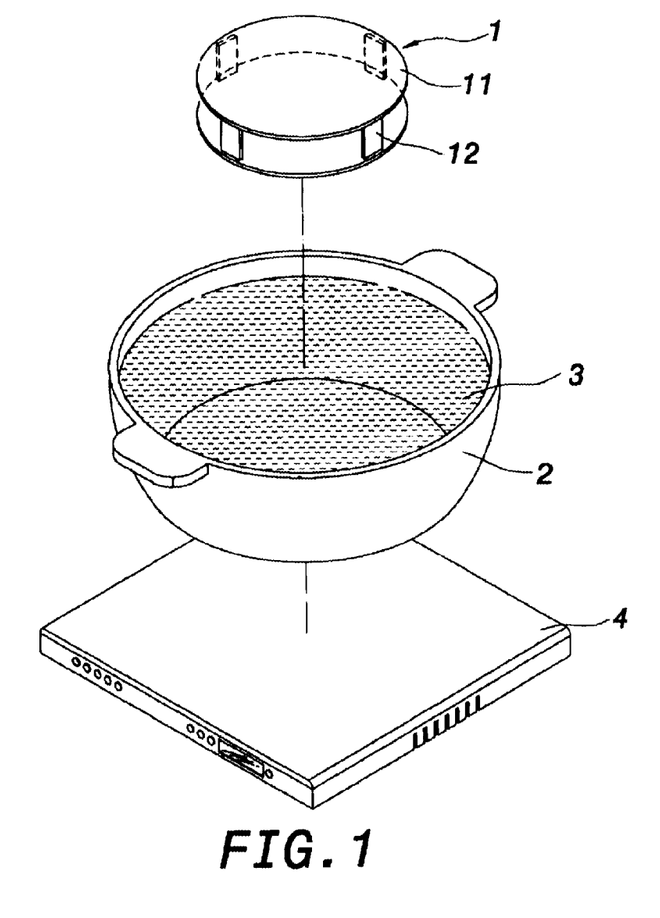
FIG. 1 is an exploded view of a water magnetizer according to a first preferred embodiment of the present invention.
Figure 2:
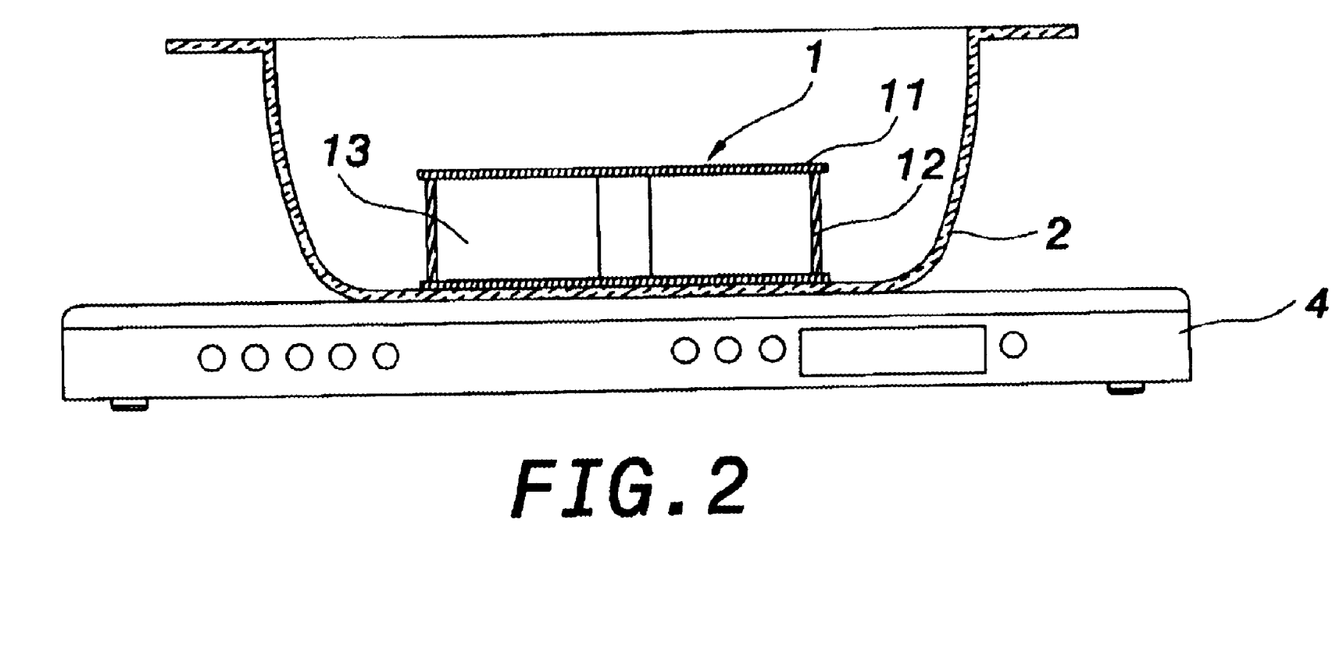
FIG. 2 is a cross-sectional view of the water magnetizer according to the first preferred embodiment of the present invention.

FIG. 1 and FIG. 2 show a water magnetizer according to one preferred embodiment of the present invention. The water magnetizer includes a permeance member 1 which consists of two parallel disks 11 spaced apart each other by a plurality of partitions 12 located along the periphery of the disks 11, such that there is clearance 13 between the two parallel disks 11. The permeance member 1 is placed into a cooking recipient 2 that can be made of permeance material or non-permeance material. One of the parallel disks 11 is attached onto a bottom of the cooking recipient 2. The cooking recipient 2 is charged with water 3 and placed onto an electromagnetic heater 4.

Figure 3:
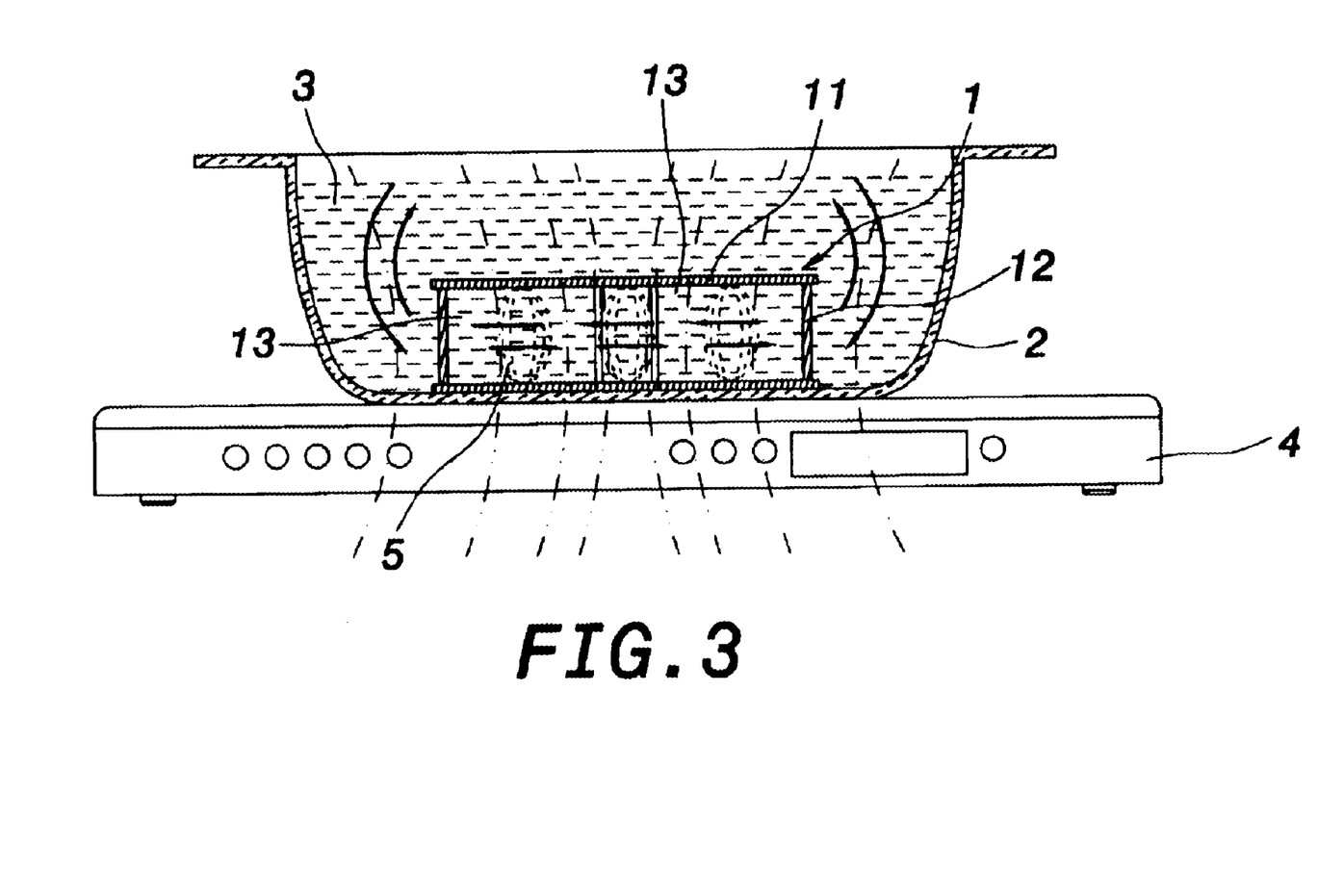
FIG. 3 illustrates the water magnetizer when in use according to the first preferred embodiment of the present invention.

In FIG. 3, when the electromagnetic heater 4 powers on, inner coils (not shown) of the electromagnetic heater 4 regularly vibrate at high frequency to change the direction of electric current, thereby continuously changing the magnetic lines of force generated by the coils of the electromagnetic heater 4 to induce a swirled magnetic field 5 in the clearance 13 between the disks 11. At the same time, because of the magnetic reluctance of the permeance member 1, the water 3 would be boiled by a lot of heat generated from electron movement in the induced magnetic field 5.

During boiling of the water 3, the water 3 circulates inside the clearance 13. Therefore, the water 3 continuously flows into the induced magnetic field 5 and vibrates at high frequency. The agglomerates of water molecules become smaller and smaller to form magnetized water which can dissolve more oxygen and prevent limescales from being generated. The magnetized water can provide more advantages such as good taste, activation of human cells, and increased metabolism.

Figure 4:
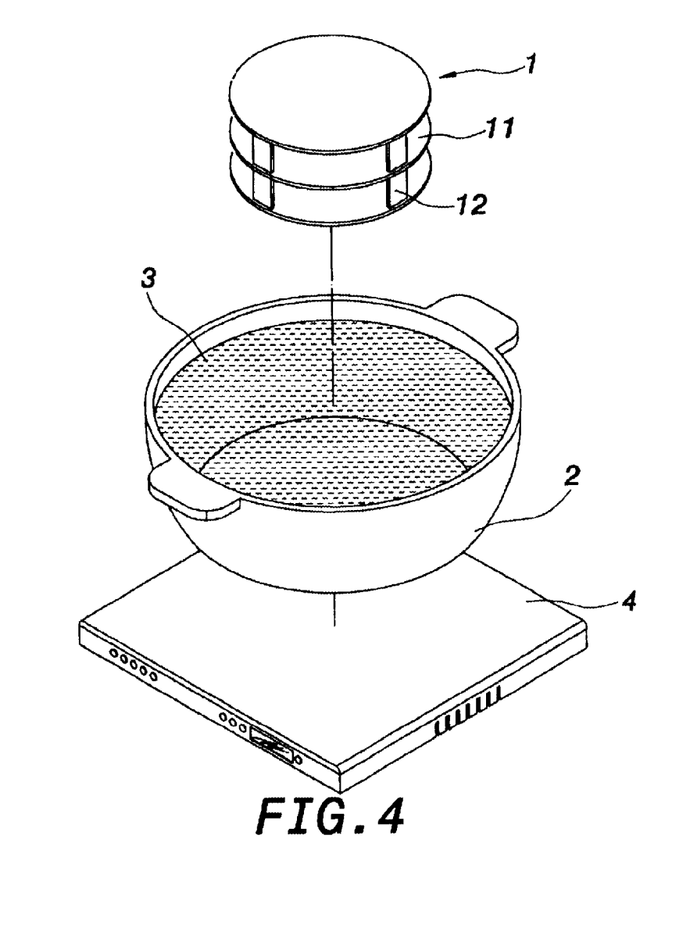
FIG. 4 is an exploded view of the water magnetizer jointing an external 4 disk according to the first preferred embodiment of the present invention.

In FIG. 4, the upper disk 11 can be further provided with a plurality of partitions 12 located along the periphery of the upper disk 11 to externally joint an additional disk 11 on a top surface of the upper disk 11, thereby forming more than one clearance for speeding up the magnetization of the water 3. A stack of disks 11 configured in the same way as the above can be used in the present invention.

Figure 5:
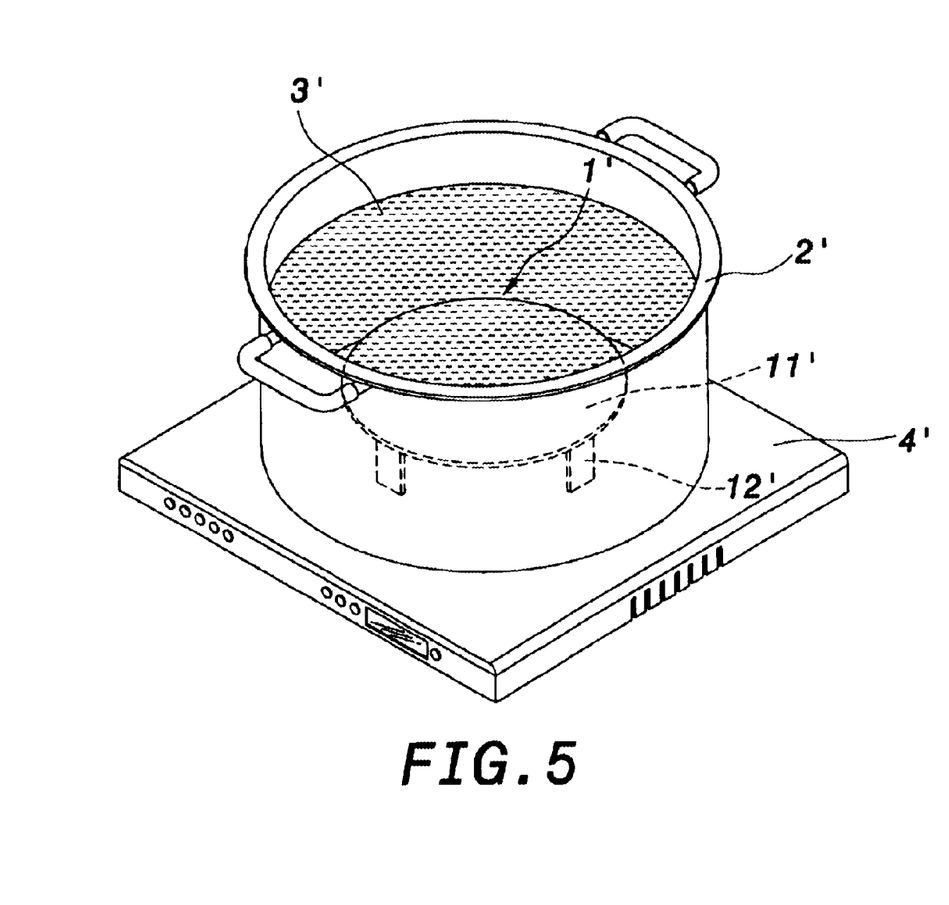
FIG. 5 is a perspective view of a water magnetizer when in assembly according to a second preferred embodiment of the present invention.
Figure 6:
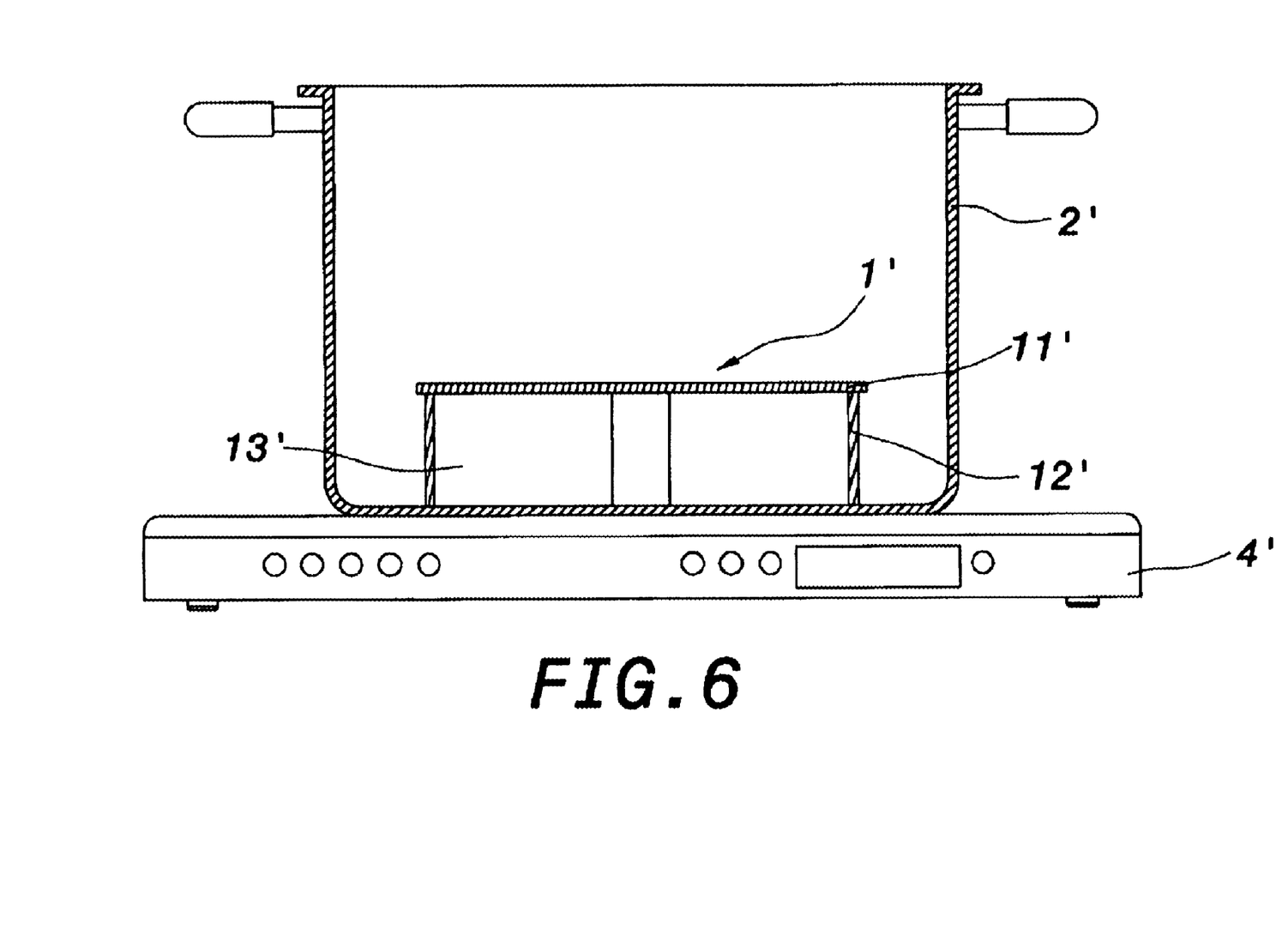
FIG. 6 is a cross-sectional view of the water magnetizer according to the second preferred embodiment of the present invention.

FIG. 5 and FIG. 6 show a water magnetizer according to another preferred embodiment of the present invention. The water magnetizer includes permeance member 1' which consists of a disk 11' and a plurality of partitions 12' arranged along the periphery of the disk 11'. The disk 11' is placed into a bottom of cooking recipient 2' such that the disk 11' is spaced apart the bottom of the cooking recipient 2' by the partitions 12'. A clearance 13' is therefore formed between the disk 11' and the bottom of the cooking recipient 2'. The cooking recipient 2 that can be made of permeance material is charged with water 3' and then placed onto an electromagnetic heater 4.

Figure 7:
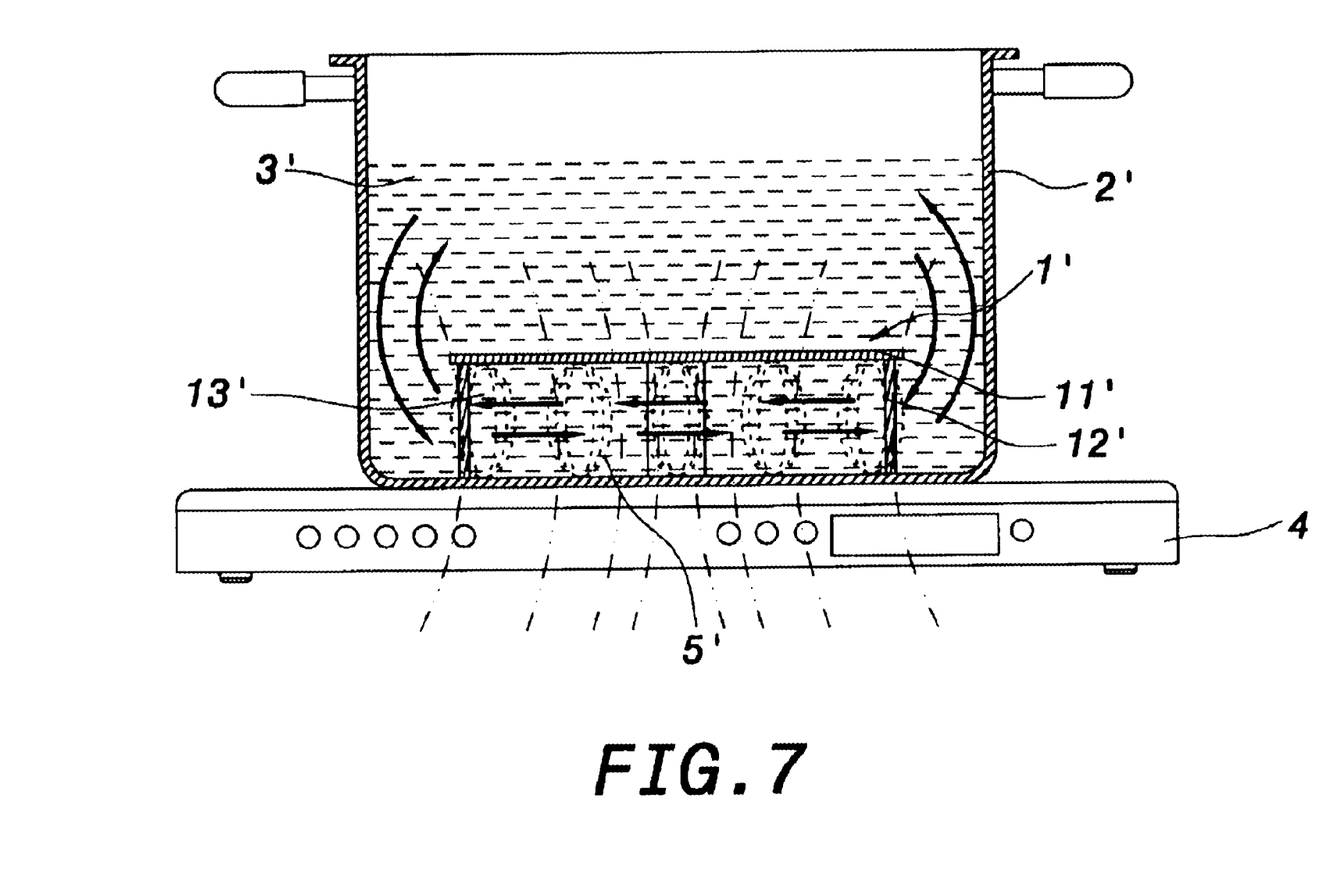
FIG. 7 illustrates the water magnetizer when in use according to the second preferred embodiment of the present invention.

In FIG. 7, when the electromagnetic heater 4' powers on, inner coils (not shown) of the electromagnetic heater 4' regularly vibrate at high frequency to change the direction of electric current, thereby continuously changing the magnetic lines of force generated by the coils of the electromagnetic heater 4, to induce a swirled magnetic field 5' in the clearance 13 between the disk 11' and the bottom of the cooking recipient 2'. At the same time, because of the magnetic reluctance of the permeance member 1', the water 3, would be boiled by a lot of heat generated from electron movement in the induced magnetic field 5'.

During boiling of the water 3', the water 3' circulates inside the clearance 13'. Therefore, the water 3' continuously flows into the induced magnetic field 5' and vibrates at high frequency. The agglomerates of water molecules become smaller and smaller to form magnetized water which can dissolve more oxygen and prevent limescales from being generated. The magnetized water can provide more advantages such as good taste, activation of human cells, and increased metabolism.

Figure 8:
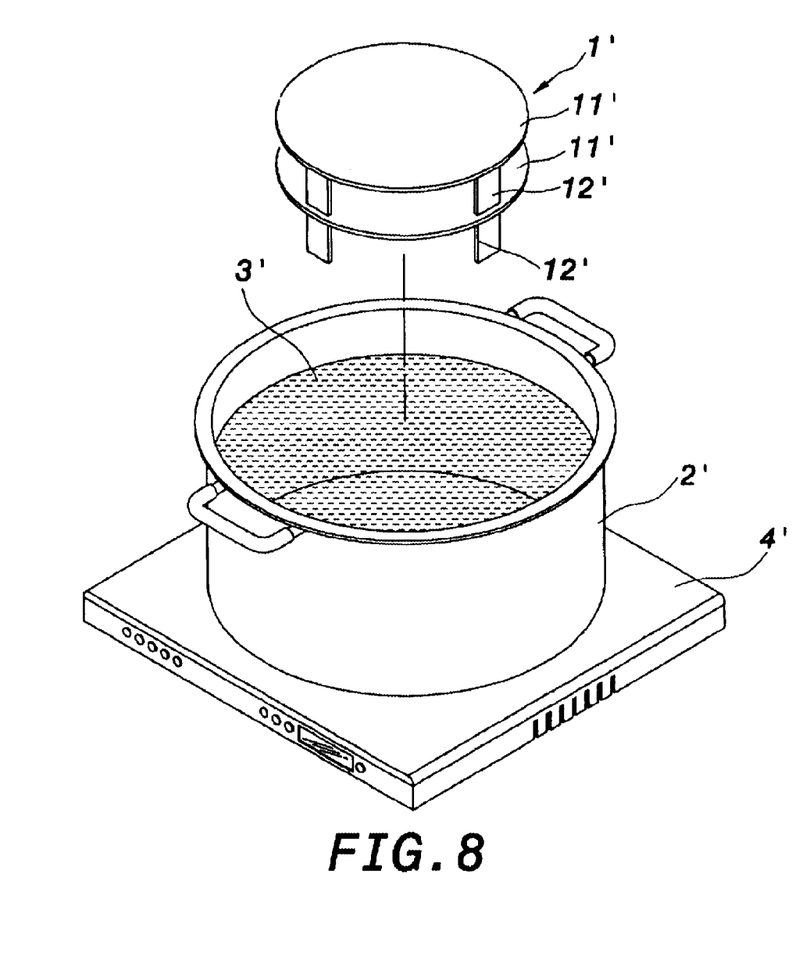
FIG. 8 is an exploded view of the water magnetizer jointing an external 4 permeable member according to the first preferred embodiment of the present invention.

In FIG. 8, the disk 11' can be further provided with a plurality of partitions 12' located along the periphery of the upper disk 11 to externally joint an additionally disk 11', thereby forming more than one clearance for speeding up the magnetization of the water 3. A stack of disks 11' configured in the same way as the above can be used in the present invention.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. An apparatus for holding water during electromagnetic heating thereof comprising:
   (a) a cooking recipient for coupling to an electromagnetic heating source, said cooking recipient having an inner surface;
   (b) a permeance member disposed upon said inner surface of said cooking recipient, said permeance member including:
      at least one disk formed of a material having a magnetic permeance property; and,
      ii. a plurality of partitions disposed in angularly spaced manner along a peripheral portion of said disk to extend therefrom toward said inner surface of said cooking recipient, said partitions being spaced one from the other to define at least one open gap therebetween for generating a magnetic reluctance within said cooking recipient during the electromagnetic heating of water therein.

2. The apparatus as recited in claim 1 comprising a plurality of said disks transversely spaced one from the other by said partitions, one of said disks bearing against said inner surface of said cooking recipient.

3. The apparatus as recited in claim 1 comprising at least three of said disks, adjacent ones of said disks being transversely spaced one from the other by a set of said partitions.

4. The apparatus as recited in claim 1 wherein said cooking recipient is formed of a material having a magnetic permeance property.

5. An apparatus for holding water during electromagnetic heating thereof comprising:
   (a) a cooking recipient for coupling to an electromagnetic heating source, said cooking recipient having an inner surface;
   (b) at least a first permeance member disposed upon said inner surface of said cooking recipient, said first permeance member including:
      i. at least one disk formed of a material having a magnetic permeance property; and,
      ii. a plurality of partitions disposed in angularly spaced manner along a peripheral portion of said disk to extend therefrom to engage said inner surface of said cooking recipient, said partitions being spaced one from the other to define at least one open gap therebetween for generating a magnetic reluctance within said cooking recipient during the electromagnetic heating of water therein.

6. The apparatus as recited in claim 5 further comprising a second permeance member stacked onto said first permeance member, said second permeance member including:
   i. at least one disk formed of a material having a magnetic permeance property; and,
   ii. a plurality of partitions angularly displaced along a peripheral portion of said disk to extend therefrom toward said inner surface of said cooking recipient, said partitions being spaced one from the other to define at least one open gap therebetween for generating a magnetic reluctance within said cooking recipient during the electromagnetic heating of water therein.

* * * * *